US012578224B2

(12) United States Patent
Plechinger

(10) Patent No.: US 12,578,224 B2
(45) Date of Patent: Mar. 17, 2026

(54) MEASUREMENT METHOD FOR CHARACTERIZATION OF A PHOTODETECTOR

(71) Applicant: ams-OSRAM International GmbH, Regensburg (DE)

(72) Inventor: Gerd Plechinger, Saal A.D. Donau (DE)

(73) Assignee: ams-OSRAM Internatioanl GmbH, Regensburg (DE)

( * ) Notice: Subject to any disclaimer, the term of this patent is extended or adjusted under 35 U.S.C. 154(b) by 156 days.

(21) Appl. No.: 18/564,177

(22) PCT Filed: Mar. 31, 2022

(86) PCT No.: PCT/EP2022/058518
§ 371 (c)(1),
(2) Date: Nov. 27, 2023

(87) PCT Pub. No.: WO2022/248106
PCT Pub. Date: Dec. 1, 2022

(65) Prior Publication Data
US 2024/0247977 A1     Jul. 25, 2024

(30) Foreign Application Priority Data

May 28, 2021     (DE) ..................... 10 2021 113 849.3

(51) Int. Cl.
G01J 1/08        (2006.01)
G01J 1/02        (2006.01)
(Continued)

(52) U.S. Cl.
CPC . G01J 1/08 (2013.01); G01J 1/44 (2013.01); G01J 1/0295 (2013.01);
(Continued)

(58) Field of Classification Search
CPC .......... G01J 1/08; G01J 1/44; G01J 2001/083; G01J 2001/446; G01J 2001/4242; G01J 1/0295
(Continued)

(56) References Cited

U.S. PATENT DOCUMENTS 4,816,687 A * 3/1989 Fehrenbach ......... C09K 11/676
356/311
5,591,962 A * 1/1997 Koishi ................... H04B 10/60
250/214 R
(Continued)

FOREIGN PATENT DOCUMENTS

EP          0 691 758 A1     1/1996
WO          93/10553 A1     5/1993

OTHER PUBLICATIONS

Annotated Application of a Si composite bolometer in an IR spectrophotometer by Makai et al. (Year: 1994).*
(Continued)

*Primary Examiner* — Tarifur R Chowdhury
*Assistant Examiner* — Kaitlyn E Kidwell
(74) *Attorney, Agent, or Firm* — HAUPTMAN HAM, LLP

(57) ABSTRACT

A measurement method for characterization of a photodetector includes illumination of the photodetector with a variable electromagnetic radiation. The variable electromagnetic radiation has a temporally oscillating radiation intensity with fixed period and amplitude. The method also includes illumination of the photodetector with a first electromagnetic radiation having a temporally constant first radiation intensity and measurement of a first output signal at the photodetector. The method further includes illumination of the photodetector with a second electromagnetic radiation having a temporally constant second radiation intensity different from the first radiation intensity and
(Continued)

measurement of a second output signal at the photodetector. The method additionally includes determination of a non-linearity of the photodetector by comparing the measurements of the first and second output signals.

8 Claims, 2 Drawing Sheets

(51) Int. Cl.
    *G01J 1/42*            (2006.01)
    *G01J 1/44*            (2006.01)

(52) U.S. Cl.
    CPC . *G01J 2001/083* (2013.01); *G01J 2001/4242*
                (2013.01); *G01J 2001/446* (2013.01)

(58) Field of Classification Search
    USPC ........................................................ 356/213
    See application file for complete search history.

(56) References Cited

U.S. PATENT DOCUMENTS

| | | | | |
|---|---|---|---|---|
| 2006/0060759 | A1* | 3/2006 | Predina | ..................... G01J 5/53 |
| | | | | 356/218 |
| 2011/0122402 | A1* | 5/2011 | Westphal | ........... G01N 21/6408 |
| | | | | 356/217 |
| 2015/0292938 | A1* | 10/2015 | Guimond | .............. G01J 1/4257 |
| | | | | 250/214.1 |
| 2017/0276548 | A1 | 9/2017 | Smith et al. | |
| 2017/0363465 | A1* | 12/2017 | Send | ......................... G01J 1/08 |
| 2021/0156786 | A1* | 5/2021 | von Volkmann | ...... H05B 45/32 |

OTHER PUBLICATIONS

Sinusoidal Radiation Chopper by Belvin (Year: 1973).*
Tuning Fork Chopper With Integrated Drive Electronics (Year: 2015).*
International Search Report issued for corresponding International Patent Application No. PCT/EP2022/058518 on Sep. 2, 2022, along with an English translation (6 pages).
Written Opinion issued for corresponding International Patent Application No. PCT/EP2022/058518 on Sep. 2, 2022 (6 pages).
Schaefer et al., "Silicon detector nonlinearity and related effects", Applied Optics, vol. 22, No. 8, Apr. 15, 1983, pp. 1232-1236 (5 pages).
Makai et al., "Application of a Si composite bolometer in an IR spectrophotometer", Proceedings of SPIE vol. 2269, Infrared Technology XX, Oct. 17, 1994, pp. 772-779 (9 pages).
López et al., "Measurement of the Nonlinearity of Ge- and InGaAs-Photodiodes at High Irradiance Levels", Journal of Metrology Society of India, vol. 25, No. 1, 2010, pp. 47-52 (6 pages).
OSI Optoelectronics, "Photodiode Characteristics and Applications", Dec. 31, 2015 <http://www.osioptoelectronics.com/application-notes/an-photodiode-parameters-characteristics.pdf> (6 pages), cited in NPL No. 1.

* cited by examiner

MEASUREMENT METHOD FOR CHARACTERIZATION OF A PHOTODETECTOR

CROSS REFERENCE TO RELATED APPLICATION

This application is a National Stage of International Application No. PCT/EP2022/058518, filed on Mar. 31, 2022, which designates the United States and was published in Europe, and which claims priority to German Patent Application No. 10 2021 113 849.3, filed on May 28, 2021, in the German Patent Office. Both of the aforementioned applications are hereby incorporated by reference in their entireties.

SUMMARY

A measurement method for characterization of a photodetector is specified.

At least one object of certain embodiments is to provide an improved measurement method for characterization of a photodetector.

According to at least one embodiment of the measurement method, illumination of a photodetector to be characterized is performed with a variable electromagnetic radiation.

The photodetector is, for example, a photodiode or a phototransistor. In the example of the photodiode, the photodiode is e.g. operated with a negative bias voltage and is connected in series with an ohmic resistor.

The variable electromagnetic radiation is, for example, light, in particular in the infrared, visible, or ultraviolet spectral range, and is generated by means of an illumination element. In particular, the wavelength range in which the variable electromagnetic radiation lies can be matched to the photodetector to be characterized. That is, the wavelength range can be selected so that it lies in the range of the greatest sensitivity of the photodetector to be characterized. The variable electromagnetic radiation has a time-variable radiation intensity, preferably an oscillation with a fixed period and amplitude.

According to a further embodiment, the variable electromagnetic radiation is generated by means of an optoelectronic semiconductor element, for example a light-emitting diode or a laser diode. In the example of the light-emitting diode, the variable electromagnetic radiation is generated by applying an electric voltage to the light-emitting diode, which consists of a constant component and a time-variable component. The time constant component of the electric voltage is used to set the operating point of the light-emitting diode in a linear range of the current-voltage characteristic. The time-variable component of the electric voltage is, for example, temporally oscillating with a fixed period and amplitude, in particular with a sinusoidally or rectangularly oscillating electric voltage.

According to a further embodiment, the photodetector to be characterized is additionally illuminated with a first electromagnetic radiation which has a temporally constant first radiation intensity that and which is generated by means of a further illumination element, for example a light-emitting diode. Here and in the following, the words "temporally constant" refer to the duration of the measurement process. The time-variable electromagnetic radiation and the temporally constant first electromagnetic radiation thereby simultaneously illuminate the photodetector to be characterized. The wavelength ranges of the time-variable electromagnetic radiation and the temporally constant first electromagnetic radiation can overlap or be the same.

According to at least one embodiment, a first output signal is measured at the photodetector while the photodetector is illuminated with the variable electromagnetic radiation and the first, temporally constant electromagnetic radiation. The photocurrent, which is generated by the common illumination of the photodiode with the variable electromagnetic radiation and the first, temporally constant electromagnetic radiation, gives rise, for example, to a voltage drop at the ohmic resistor, which forms the first output signal of the photodetector.

According to a further embodiment, the output signal of the photodetector is measured by means of a phase-sensitive rectifier, also referred to as a lock-in amplifier. A reference signal with the same period and phase as that of the variable, temporally oscillating electromagnetic radiation is applied to the corresponding input of the phase-sensitive rectifier. For example, the temporally oscillating electric voltage that is applied to the light-emitting diode in the case of the light-emitting diode as an illumination element for generating the variable electromagnetic radiation is also used as the reference signal. The mode of operation of the phase-sensitive rectifier consists in measuring only the temporally oscillating component of an input signal which has the same frequency and phase as the reference signal with high accuracy and independently of signal components with different frequency or phase, in particular independently of time-constant signal components. In the example of the measurement method for characterization of a photodetector described herein, the phase-sensitive rectifier acts as a narrowband bandpass filter and amplifies only the component of the output signal of the photodetector that has the same period and phase as that of the temporally oscillating, variable electromagnetic radiation incident thereon. In particular, in this embodiment, the measurement signal at the phase-sensitive rectifier is directly proportional to the amplitude of the temporally oscillating output signal at the photodetector, and thus proportional to the intensity of the variable electromagnetic radiation incident on the photodetector. However, a direct proportionality between the measurement signal and the intensity of the variable electromagnetic radiation only arises for a linear photodetector. For the case of a nonlinear photodetector, the amplitude of the measurement signal at the phase-sensitive rectifier also depends on the temporally constant first radiation intensity of the first electromagnetic radiation with which the photodetector is additionally illuminated.

According to a further embodiment, in a further step the photodetector is illuminated with a second electromagnetic radiation having a temporally constant second radiation intensity which is different from the first radiation intensity. Preferably, the same illumination element is used to generate the second electromagnetic radiation as was used in the previous step to generate the first electromagnetic radiation. In particular, this means that the first and second electromagnetic radiation can be in the same wavelength range. The time-varying electromagnetic radiation and the temporally constant second electromagnetic radiation thereby simultaneously illuminate the photodetector to be characterized.

According to at least one embodiment of the method, the same method is used to measure the second output signal at the photodetector as in the case of illumination with the first electromagnetic radiation. In particular, the measurement of the second output signal at the photodetector is performed by means of a phase-sensitive rectifier. The measurement signal at the phase-sensitive rectifier is in turn directly proportional to the temporally oscillating component of the second output signal at the photodetector and thus proportional to the intensity of the variable electromagnetic radiation that is incident on the photodetector.

In a further embodiment, a nonlinearity of the photodetector to be characterized, for example a photodiode or a phototransistor, is determined by comparing the measurements of the first and second output signals. Preferably, the nonlinearity is expressed in units of ppm (parts per million) and is determined, for example, by the difference in the measurement signals at the phase-sensitive rectifier between the first measurement performed with a temporally constant first radiation intensity and the second measurement made with a second temporally constant radiation intensity. This difference is divided by the reference value, for example the measurement signal of the first or the second measurement, multiplied by $10^6$ and represents a measure of a nonlinearity of the photodetector in ppm. The nonlinearity determined in this way can be represented, for example, as a function of the electric current flowing through the illumination element providing the temporally constant first and/or second electromagnetic radiation. Alternatively, the nonlinearity determined in this way can also be represented as a function of the brightness of this illumination element. However, this requires an external calibration of the brightness of the illumination element. In the case of a linear photodetector, the measurement signal at the phase-sensitive rectifier is independent of the temporally constant first or second electromagnetic radiation intensity. In the case of a nonlinear photodetector, the measurement signal at the phase-sensitive rectifier is dependent on the temporally constant first or second radiation intensity. Thus, a nonlinearity of the photodetector can be determined by comparing the measurements of the first and second output signals.

According to at least one embodiment, the measurement method for characterization of a photodetector comprises the steps of:

illumination of the photodetector with a variable electromagnetic radiation, the variable electromagnetic radiation having a temporally oscillating radiation intensity with a fixed period and amplitude, illumination of the photodetector with a first electromagnetic radiation having a temporally constant first radiation intensity, and measuring a first output signal at the photodetector, illumination of the photodetector with a second electromagnetic radiation having a temporally constant second radiation intensity different from the first radiation intensity and measuring a second output signal at the photodetector, determination of a nonlinearity of the photodetector by comparing the measurements of the first and second output signals.

The method described herein is based on the following considerations, among others.

In many applications, especially biomonitoring applications in wearable devices, a highly linear photodetector is of particular importance. Typically, modulated light, for example from a light emitting diode or a surface emitting laser diode, is emitted from the wearable biomonitoring device. This light is at least partially reflected and partially absorbed by, for example, human skin or tissue. The reflected or transmitted light is usually measured by a photodetector, for example a photodiode. Here, the modulated photocurrent in the photodetector caused by the light emitter should be independent of any background light that is additionally incident on the photodetector. This background light can be, for example, sunlight or artificial room lighting. To avoid measurement errors in the amplitude of the at least partially reflected or transmitted modulated light, a highly linear photodetector is desirable.

Measurement methods are possible to determine a nonlinearity of photodetectors using externally calibrated illumination elements. These methods can have large systematic measurement errors. Therein, the photodetector is illuminated with a temporally constant light intensity of an external illumination element, whereby different brightnesses with defined intensity can be specified. These intensities must first be calibrated externally. For different intensities, the photocurrent generated in the photodetector is measured. In the case of a perfectly linear photodetector, the intensity and the corresponding photocurrent are linearly correlated. Any deviation from this linear correlation is defined as a nonlinearity. A nonlinearity can be determined from the measurement of the photocurrent for different temporally constant brightnesses. However, this method presents some difficulties. On the one hand, an external calibration of the temporally constant light intensity of the illumination element is necessary. On the other hand, this measurement method has large systematic errors. In particular, errors in the determination of the distance between the calibrated light source and the photodetector to be measured, as well as thermal effects, which can unfavorably influence the stability of the calibrated illumination element at different intensities, generally lead to systematic measurement errors. Such measurement methods often do not allow to determine a nonlinearity of photodetectors with an accuracy of less than a few hundred ppm.

By contrast, the measurement method disclosed herein is in particular self-referential and does not require an externally calibrated light source to determine a nonlinearity of the photodetector. Furthermore, the measurement method disclosed herein allows to determine a nonlinearity of the photodetector with an accuracy of less than 100 ppm. This is a consequence of the high signal-to-noise ratio of phase-sensitive rectifiers, which can measure the output signal at the photodetector caused by the temporally oscillating variable electromagnetic radiation with high accuracy.

According to a further embodiment, the variable electromagnetic radiation exhibits a temporal oscillation with a period of at least 0.4 milliseconds. Alternatively or additionally, the variable electromagnetic radiation exhibits a temporal oscillation with a period of at most 40 milliseconds. In the range between at least 0.4 milliseconds and at most 40 milliseconds, in particular, the signal-to-noise ratio is almost independent of the period of the temporally variable radiation.

According to a further embodiment, the variable electromagnetic radiation has a temporal oscillation with a sinusoidal or rectangular waveform. In addition, suitable other waveforms with a fixed period and a fixed amplitude can also be used, such as a sawtooth-shaped signal, since the phase-sensitive rectifier typically measures only the fundamental frequency of the respective signal.

According to a further embodiment, the first or second radiation intensity is zero. In order to more accurately determine a nonlinearity of the photodetector within a predetermined intensity range of the electromagnetic radiation, multiple measurements of the output signal at the photodetector may be performed at different intensities of the temporally constant first or second electromagnetic radiation. Since in one embodiment the determination of a nonlinearity of the photodetector is performed by comparing two output signals, in particular a first and a second output signal corresponding to the illumination of the photodetector with a first and a second constant radiation intensity, at least two measurements of the output signal are necessary. The first or the second output signal can be considered as a reference value against which a nonlinearity is determined. This reference value can, for example, correspond to a vanishing intensity of the first or second constant electromagnetic radiation.

Further measurements for a more accurate characterization of a nonlinearity of the photodetector at other intensities of the second or first constant electromagnetic radiation preferably refer to the same reference value. For example, several measurements of the second output signal are performed with different constant intensities of the second electromagnetic radiation, while the measurement of the first output signal with, for example, vanishing intensity of the first electromagnetic radiation forms the reference value for all measurements of the second output signal. To reduce measurement errors, for example thermal effects, the measurement of the reference value, for example of the first output signal, can be repeated before or after each measurement of the second output signal. Since a reference value can in principle be chosen arbitrarily, it is also possible to choose a non-zero first or second radiation intensity for defining the reference value.

According to a further embodiment, the measurement of the first and/or the second output signal is performed more than once and the corresponding measurement results are averaged. For example, the first as well as the second output signal can be averaged over 10 measurements at the same intensity of the first and the second electromagnetic radiation, respectively. This averaging allows, in particular, to at least partially eliminate statistical measurement errors, which may arise from stability problems of the illumination elements due to thermal fluctuations at different intensities, from the determination of a nonlinearity of the photodetector.

According to a further embodiment, the variable electromagnetic radiation is emitted, for example, by a light-emitting diode which is operated in the linear range of the current-voltage characteristic. Setting the operating point of the light-emitting diode in the linear range of the current-voltage characteristic avoids, for example, measurement errors due to random fluctuations of the light intensity at very low brightnesses, especially in the vicinity of the threshold voltage of the light-emitting diode, where small voltage fluctuations can lead to large intensity fluctuations.

According to a further embodiment, the photodetector to be characterized is a photodiode connected in series with an ohmic resistor. The photocurrent generated by the photodiode leads to a measurable voltage drop across the ohmic resistor. This voltage drop forms the output signal of the photodetector, which can be measured, for example, using the phase-sensitive rectifier.

According to a further embodiment, the bias voltage at the photodiode, which is in series connection with an ohmic resistor, is kept constant by readjustment. The operating point of the photodiode is generally set by applying a negative bias voltage. However, the photocurrent generated by the incident light causes a voltage drop across the series-connected ohmic resistor, which can lead to a change in the bias voltage and thus of the operating point at the photodiode. In order not to influence an accurate determination of a nonlinearity of the photodiode by a shift of the operating point, the bias voltage at the photodiode can be kept constant and thus the operating point can be fixed. The bias voltage can be readjusted, for example, with the aid of a source measure unit (SMU).

BRIEF DESCRIPTION OF THE DRAWINGS

Further advantages, advantageous embodiments and further developments follow from the exemplary embodiments described in connection with the figures below.

DETAILED DESCRIPTION

In the exemplary embodiments in the figures, identical, similar or similarly acting elements may each be provided with the same reference sign. The elements shown and their proportions to one another are not to be regarded as true to scale. Rather, individual elements and areas may be shown exaggeratedly large or small for better representability and/or better understanding.

Figure 1:
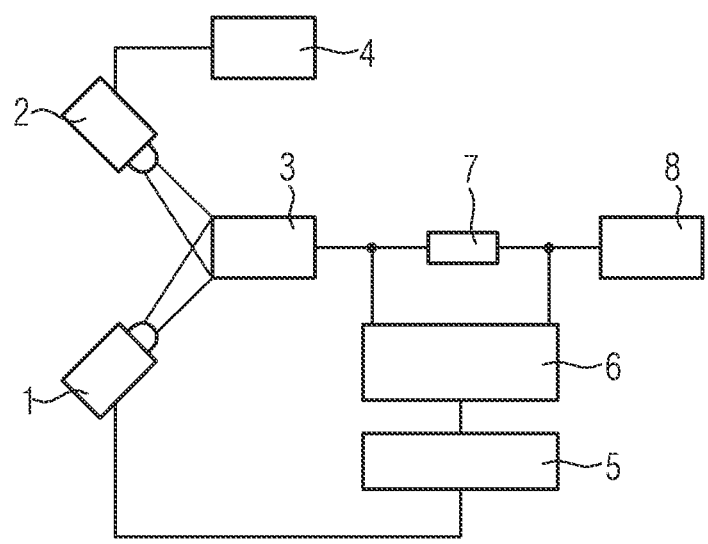
FIG. 1 shows a schematic representation of a measurement setup according to an exemplary embodiment.

FIG. 1 shows the schematic measurement setup according to an exemplary embodiment. The photodetector 3, for example a photodiode or a phototransistor, is illuminated by a first illumination element 1 and a second illumination element 2. The first illumination element 1 thereby emits a time-variable electromagnetic radiation, while the second illumination element 2 emits a temporally constant first or second electromagnetic radiation. The electromagnetic radiation is, for example, light in the infrared, visible or ultraviolet spectral range. The first illumination element 1, for example a light-emitting diode, is thereby fed by a signal generator 5, which provides a constant voltage for setting the operating point, as well as a temporally oscillating voltage with a fixed period and amplitude for generating the time-variable electromagnetic radiation. The temporally oscillating signal from the signal generator is also fed as a reference signal to the corresponding input of the phase-sensitive rectifier 6.

The second illumination element 2, for example a light-emitting diode, generates a temporally constant first or second electromagnetic radiation and is operated, for example, by means of a first source-measure-unit 4, which allows to measure the electric current received by the illumination element.

In this embodiment, the photodetector 3 to be characterized, for example a photodiode, is connected in series with an ohmic resistor 7 and is supplied by a second source-measure unit 8. The latter is used to set a constant bias voltage at the photodiode. In particular, the bias voltage at the photodiode is kept constant during the measurement process in order to keep the operating point of the photodiode stable. The photocurrent generated by the incident light on the photodiode produces a voltage drop across the ohmic resistor, which forms the output signal of the photodetector 3 and thus the input signal at the phase-sensitive rectifier 6.

For example, at a constant amplitude of the temporally oscillating signal generated by means of the signal generator 5, the measurement signal of the phase-sensitive rectifier 6 is a constant directly proportional to the amplitude of the temporally oscillating component of the output signal at the photodetector.

7

Figure 2:
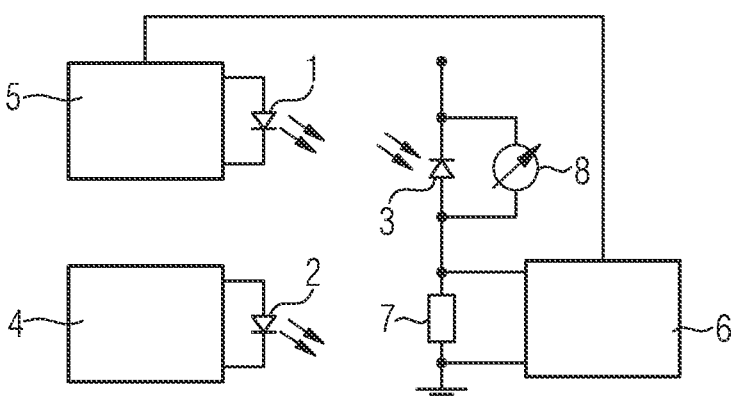
FIG. 2 shows a schematic circuit diagram of the measurement setup of an exemplary embodiment.

FIG. 2 shows the schematic circuit diagram of an embodiment, whereby in the example shown the photodetector is a photodiode 3. The two illumination elements, which generate the time-variable as well as the temporally constant electromagnetic radiation, are designed as light-emitting diode 1 and light-emitting diode 2 in this exemplary embodiment. The first light-emitting diode 1, which serves as a time-variable radiation source, is operated by a signal generator 5, whose temporally oscillating output signal also serves as a reference input signal at the phase-sensitive rectifier 6.

In this exemplary embodiment, the second light-emitting diode 2, which emits a temporally constant electromagnetic radiation, is operated by a first source-measure unit 4. Apart from setting the desired intensity of the light, the SMU allows a measurement of the electric current flowing through the light-emitting diode 2. Here, the voltage drop generated by the photocurrent across the ohmic resistor 7, which is connected in series with the photodiode 3, forms the output signal of the photodetector, which is measured by the phase-sensitive rectifier 6. A second source-measure unit 8 serves to keep the bias voltage at the photodiode constant.

Figure 3:
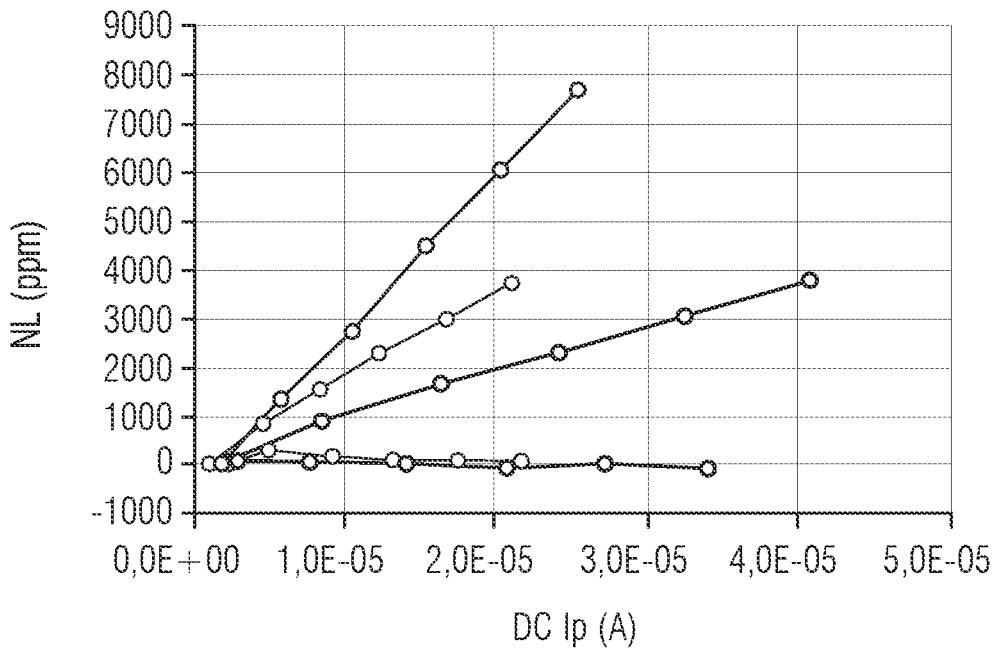
FIG. 3 shows exemplary measurement curves of a nonlinearity of different photodetectors.

FIG. 3 shows five exemplary measurement curves of a nonlinearity of five different photodetectors, measured in ppm as a function of the electric current flowing through the illumination element 2 during the measurement of the second output signal in this exemplary embodiment. Alternatively, the nonlinearity can also be represented as a function of the brightness of this illumination element, but this would require an external calibration of the illumination element 2. Here, each measurement curve consists of several measurement points, wherein each measurement point represents a comparison of a second output signal with a first output signal. In the exemplary embodiment shown here, the temporally constant first radiation intensity for each measuring point is zero and forms the reference value for determining a nonlinearity. In this exemplary embodiment, the nonlinearity at each measurement point is determined by the difference between the second and the first, i.e. the reference measurement signal, that is output from the phase-sensitive rectifier, divided by the first, i.e. the reference measurement signal, multiplied by 10^6, thereby expressing the nonlinearity in the unit ppm (parts per million). For example, the output signal measured by the phase sensitive rectifier in this exemplary embodiment is the electrical voltage drop across the ohmic resistor caused by the photocurrent from the photodiode.

The invention is not limited to specific embodiments by the description on the basis of said embodiments. Rather, the invention encompasses any new feature as well as any combination of features, which in particular includes any combination of features in the patent claims, even if this feature or combination itself is not explicitly stated in the patent claims or embodiments.

LIST OF REFERENCE SIGNS

1 first illumination element
2 second illumination element
3 photodetector
4 first source-measure-unit (SMU)
5 signal generator
6 phase sensitive rectifier
7 ohmic resistance
8 second source-measure-unit (SMU)

8

The invention claimed is:

1. A measurement method for characterization of a photodetector, comprising the following steps:
   illuminating the photodetector with a variable electromagnetic radiation, the variable electromagnetic radiation having a temporally oscillating radiation intensity with a fixed period and amplitude,
   illuminating the photodetector with a first electromagnetic radiation having a temporally constant first radiation intensity, and measuring a first output signal at the photodetector,
   illuminating the photodetector with a second electromagnetic radiation having a temporally constant second radiation intensity different from the first radiation intensity and measuring a second output signal at the photodetector,
   determining a nonlinearity of the photodetector by comparing the measurements of the first and second output signals,
   wherein
   the photodetector is a photodiode connected in series with an ohmic resistor at which a photocurrent produces a measurable voltage drop,
   a bias voltage at the photodiode is kept constant by readjustment,
   the measurement of the first output signal and the second output signal at the photodetector is performed using a phase-sensitive rectifier which is fed with a reference signal of the same period and phase as the period and phase of the variable electromagnetic radiation, and
   wherein the nonlinearity of the photodetector is determined as a function of an electric current flowing through an illumination element while it provides the temporally constant second radiation intensity during measurement of the second output signal.

2. The measurement method according to claim 1, wherein the variable electromagnetic radiation has a temporal oscillation with a period between 0.0004 and 0.04 seconds.

3. The measurement method according to claim 1, wherein the variable electromagnetic radiation has a temporal oscillation with a rectangular waveform.

4. The measurement method according to claim 1, wherein the first or the second radiation intensity is zero.

5. The measurement method according to claim 1, wherein the measurement of the first and second output signals is performed more than once and the measurement results are averaged.

6. The measurement method according to claim 1, wherein the variable electromagnetic radiation is emitted from a light-emitting diode which is operated in the linear region of the current-voltage characteristic.

7. A measurement method for characterization of a photodetector, comprising the following steps:
   illuminating the photodetector with a variable electromagnetic radiation, the variable electromagnetic radiation having a temporally oscillating radiation intensity with a fixed period and amplitude,
   illuminating the photodetector with a first electromagnetic radiation having a temporally constant first radiation intensity, and measuring a first output signal at the photodetector,
   illuminating the photodetector with a second electromagnetic radiation having a temporally constant second radiation intensity different from the first radiation intensity and measuring a second output signal at the photodetector, determining a nonlinearity of the photodetector by comparing the measurements of the first and second output signals, wherein the photodetector is a photodiode connected in series with an ohmic resistor at which a photocurrent produces a measurable voltage drop, a bias voltage at the photodiode is kept constant by readjustment, the measurement of the first output signal and the second output signal at the photodetector is performed using a phase-sensitive rectifier which is fed with a reference signal of the same period and phase as the period and phase of the variable electromagnetic radiation, and the variable electromagnetic radiation has a temporal oscillation with a sinusoidal waveform and is provided by a light-emitting diode that is driven with a temporally oscillating voltage, and the temporally oscillating voltage is further used as the reference signal for the phase-sensitive rectifier.

8. A measurement method for characterization of a photodetector, comprising the following steps:

illuminating the photodetector with a variable electromagnetic radiation, the variable electromagnetic radiation having a temporally oscillating radiation intensity with a fixed period and amplitude, illuminating the photodetector with a first electromagnetic radiation having a temporally constant first radiation intensity, and measuring a first output signal at the photodetector, illuminating the photodetector with a second electromagnetic radiation having a temporally constant second radiation intensity different from the first radiation intensity and measuring a second output signal at the photodetector, determining a nonlinearity of the photodetector by comparing the measurements of the first and second output signals, wherein the photodetector is a photodiode connected in series with an ohmic resistor at which a photocurrent produces a measurable voltage drop, a bias voltage at the photodiode is kept constant by readjustment, the measurement of the first output signal and the second output signal at the photodetector is performed using a phase-sensitive rectifier which is fed with a reference signal of the same period and phase as the period and phase of the variable electromagnetic radiation, wherein the nonlinearity of the photodetector is determined as a function of an electric current flowing through an illumination element while it provides the temporally constant second radiation intensity during measurement of the second output signal, the nonlinearity is determined by taking a difference between the second output signal and the first output signal and dividing this difference by the first output signal, and the method is self-referential in that an intensity of the illumination element is not externally calibrated.

* * * * *